(12) United States Patent
Tran (10) Patent No.: US 6,304,956 B1
(45) Date of Patent: Oct. 16, 2001

(54) USING TWO BARREL SHIFTERS TO IMPLEMENT SHIFT, ROTATE, ROTATE WITH CARRY, AND SHIFT DOUBLE AS SPECIFIED BY THE X86 ARCHITECTURE

(75) Inventor: Dzung X. Tran, San Jose, CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/276,427

(22) Filed: Mar. 25, 1999

(51) Int. Cl.[7] ........................................ G06F 7/00
(52) U.S. Cl. ............................. 712/221; 712/224
(58) Field of Search .................... 711/221, 222, 711/224

(56) References Cited

U.S. PATENT DOCUMENTS

| | | | |
|---|---|---|---|
| 4,831,571 | 5/1989 | Takumaru | 708/209 |
| 5,155,698 | 10/1992 | Niimi | 708/209 |
| 5,729,482 | 3/1998 | Worrell | 708/209 |
| 5,751,614 | 5/1998 | Cohen | 364/716.02 |
| 5,781,457 | * | 7/1998 | Cohen | 364/716.02 |
| 5,831,877 | * | 11/1998 | Thomson | 364/715.011 |
| 5,844,825 | * | 12/1998 | Wang | 708/209 |
| 6,061,780 | * | 5/2000 | Shippy | 712/204 |
| 6,094,668 | * | 7/2000 | Oberman | 708/505 |

OTHER PUBLICATIONS

Intel, *Intel Architecture Software Developer's Manual*, "Instruction Set Reference," vol. 2, Order No. 243191, (1997) pp. 3–394 to 3–419.

Computer System Architecture by Mano, Morris M., Prentice Hall Inc., Englewood cliffs, NJ, 1982, pp 53–54.*

* cited by examiner

*Primary Examiner*—Eric Coleman
(74) *Attorney, Agent, or Firm*—Oblon, Spivak, McClelland, Maier & Neustadt, P.C.

(57) ABSTRACT

A novel method and apparatus of performing data bit moving functions on a data word using two barrel shifters: a left shifter and a right shifter. The present invention is able to handle both shift and rotate functions using one shifter unit. Specifically, for shift functions, only one of the two shifters is used to perform the shifting function. On the other hand, for rotate functions, both shifters are needed for shifting the data word. The amounts of the right shift and left shift depend on the number defined by the count operand and the specific shift/rotate instruction requested.

31 Claims, 9 Drawing Sheets

| Instruction | Operation | Carry |
|---|---|---|
| SHL | [LSH] | Ca |
| SAL | [LSH] | Ca |
| SHR | [RSH] | Ca |
| SAR | [RSH] | Ca |
| ROL | [LSH] OR [RSH] | Ca |
| ROR | [LSH] OR [RSH] | Ca |
| RCL | [LSH] OR [RSH] | Operand [No-Count] |
| RCR | [LSH] OR [RSH] | Operand [Count] |
| SHLD | [LSH] OR [RSH] | Ca |
| SHRD | [LSH] OR [RSH] | Ca |
| BTX | 1. RCR | Ca |
|  | 2. Operation on Carry bit |  |
|  | 3. RCL | X |

FIG. 9

USING TWO BARREL SHIFTERS TO IMPLEMENT SHIFT, ROTATE, ROTATE WITH CARRY, AND SHIFT DOUBLE AS SPECIFIED BY THE X86 ARCHITECTURE

BACKGROUND OF THE INVENTION

The present invention is related to the field of microprocessor design and, more particularly, to the design of shifter units used in microprocessors.

Data bits shifting is a common operation in a microprocessor design by which bits of a data word are shifted into lower order bit positions (shift right) or into higher order bit positions (shift left). However, a shifter unit is a troublesome circuit block in a microprocessor design because wide data bus is generally needed for connecting different components in the shifter unit.

The problem is further complicated when the shifter unit is required to handle both the data word shifting and rotating functions. For example, in the Intel x86 instruction set, there contains two groups of instructions (i.e. shift group, and rotate group instructions) that require either shifting or rotating function.

According to the Intel (TM) x86 instruction set, the shift instruction shifts the bits of the first operand (i.e. destination operand) to the left or right by the number of bits specified in the second operand (i.e. count operand). Bits shifted beyond the destination operand boundary are first shifted into the CF flag, then discarded. Finally, at the end of the shift operation, the CF flag contains the last bit shifted out of the destination operand. According to the Intel instruction set, the destination operand can be a register or a memory location. The count operand can be an immediate value or register CL. For a 32-bit data, the count is masked to 5 bits, which limits the count range to 0 to 31.

According to the Intel (TM) instruction set, the shift arithmetic left (SAL) and shift logic left (SHL) instructions perform the same operation; they shift the bits in the destination operand to the left (toward more significant bit locations). For each shift count, the most significant bit of the destination operand is shifted into the CF flag, and the least significant bit is cleared.

The shift arithmetic right (SAR) and shift logical right (SHR) instructions shift the bits of the destination operand to the right (toward less significant bit locations). For each shift count, the least significant bit of the destination operand is shifted into the CF flag, and the most significant bit is either set or cleared depending on the instruction type. The SHR instruction clears the most significant bit; the SAR instruction sets or clears the most significant bit to correspond to the sign (most significant bit) of the original value in the destination operand. In effect, the SAR instruction fills the empty bit position's shifted value with the sign of the unshifted value.

The SAR and SHR instructions can be used to perform signed or unsigned division, respectively, of the destination operand by powers of 2. For example, using the SAR instruction to shift a signed integer 1 bit to the right divides the value by 2.

The double precision shift left (SHLD) shifts the first operand (destination operand) to the left the number of bits specified by the third operand (count operand). The second operand (source operand) provides bits to shift in from the right (starting with bit 0 of the destination operand). The destination operand can be a register or a memory location; the source operand is a register. The count operand is an unsigned integer that can be an immediate byte or the contents of the CL register. If the count is 1 or greater, the CF flag is filled with the last bit shifted out of the destination operand. For a 1-bit shift, the OF flag is set if a sign changed occurred; otherwise, it is cleared. If the count operand is 0, the flags are not affected.

Similarly, the double precision shift right (SHRD) shifts the first operand (destination operand) to the right the number of bits specified by the third operand (count operand). The second operand (source operand) provides bits to shift in from the left (starting with the most significant bit of the destination operand). The destination operand can be a register or a memory location; the source operand is a register. The count operand is an unsigned integer that can be an immediate byte or the contents of the CL register. If the count is 1 or greater, the CF flag is filled with the last bit shifted out of the destination operand. For a 1-bit shift, the OF flag is set if a sign change occurred; otherwise, it is cleared. If the count operand is 0, the flags are not affected.

The rotate instruction shifts (rotates) the bits of the first operand (destination operand) the number of bit positions specified in the second operand (count operand) and stores the result in the destination operand. The destination operand can be a register or a memory location; the count operand is an unsigned integer that can be an immediate or a value in the CL register. The processor restricts the count to a number between 0 and 31 by masking all the bits in the count operand except the least-significant bits.

The rotate left (ROL) and rotate through carry left (RCL) instructions shift all the bits toward more-significant bit positions, except for the most significant bit, which is rotated to the least significant bit location. The rotate right (ROR) and rotate through carry right (RCR) instructions shift all the bits toward less significant positions, except for the least significant bit, which is rotated to the most significant bit location.

The RCL and RCR instructions include the CF flag in the rotation. The RCL instruction shifts the CF flag into the least significant bit and shifts the most significant bit into the CF flag. The RCR instruction shifts the CF flag into the most significant bit and shifts the least significant bit into the CF flag. For the ROL and ROR instructions, the original value of the CF flag is not a part of the result, but the CF flag receives a copy of the bit that was shifted from one end to the other.

Therefore, it is desirable to have a universal shifter unit capable of handling both the shift and rotate functions, while being able to maintain simple layout and routing designs.

SUMMARY OF THE INVENTION

It is therefore an object of the present invention to disclose a shifter unit simple in design and layout in a microprocessor environment.

It is another object of the present invention to disclose a shifter unit capable of performing both shifting functions and rotating functions on a data word.

It is a further object of the present invention to reduce routing complexity of a shifter unit in a microprocessor.

The present invention discloses a universal shifter unit comprising three major portions: a right shifter, a left shifter and control logic. Specifically, the right shifter is provided with a right shifter input word for right shifting a first number of position, whereas the left shifter is provided with a left shifter input word for left shifting a second number of position. The results of the two shifters are then provided to a merging logic for logic operations. Depending on the instruction type, the merging logic performs different logic operations on the two results. For example, in some instruction types, the two results are ORed together. In some other types, only one result is needed from one of the two shifters, and the result of the remaining shifter is ignored. Then the merging logic outputs the desired results as an output.

Additional objects, features and advantages of various aspects of the present invention will become apparent from the following description of its preferred embodiments, which description should be taken in conjunction with the accompanying drawings.

DETAILED DESCRIPTION OF THE DRAWINGS

Figure 1:
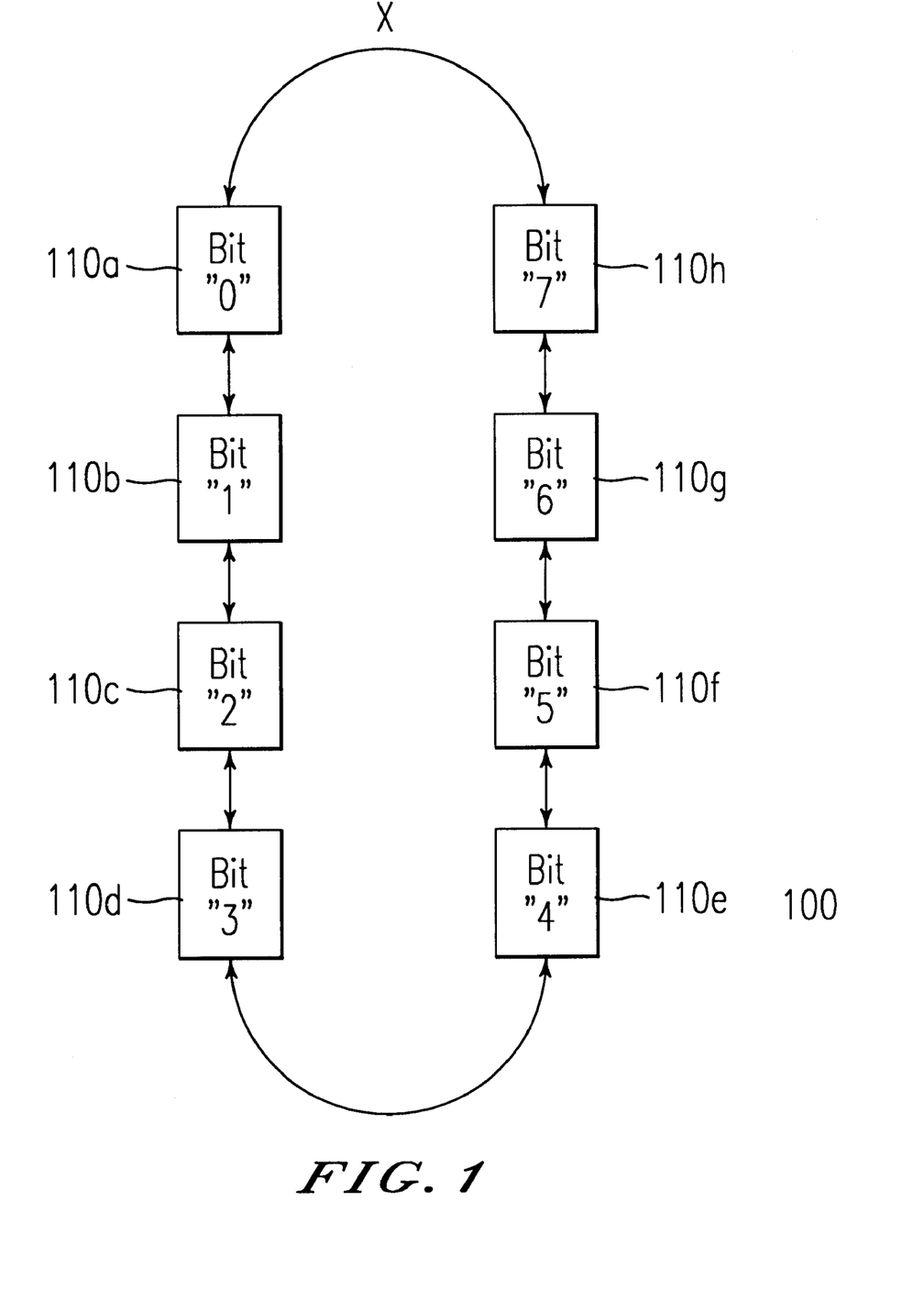
FIG. 1 shows a conventional 8-bit shifter designed to handle both data bits shifting and rotating functions.

FIG. 1 is a conventional 8-bit shifter 100 designed using standard cells to handle both data bits shifting and rotating functions. In order for a shifter to handle the rotate function, the shifter 100 is conventionally constructed in a circular fashion. That is, the least significant bit 110a (i.e. bit 0) of the shifter is placed in the neighborhood of the most significant bit 110h (i.e. bit 7 in this 8-bit shifter) of the shifter 100. By placing the least significant bit 110a and the most significant bit 110h in close neighborhood, the least significant bit 110a can be shifted to the most significant bit 110h without passing through a long routing path, or vice versa. Thus, the circular shifter 100 as shown in FIG. 1 is a well-known design methodology to reduce routing lengths and complexity of the shifter.

When the shifter 100 is performing the shift function, zeroes are normally packed at one end of the data word. Depending on whether the instruction is a right shift or a right shift, zeroes are packed in the most significant side 110h or the least significant 110a accordingly. On the other hand, when the shifter 100 is performing the rotate function, the most/least significant bit is then rotated into the least/most significant bit for each rotate count. Similarly, depending on whether the rotate instruction is a right rotate or a left rotate, data bit is shifted between the least significant bit and the least significant bit.

Therefore, by simply controlling the data bit input of the boundary bit (i.e. the most significant bit for right shift/rotate commands, and the least significant bit for left shift/rotate commands), the shifter can perform both the shift and rotate functions.

Figure 2:
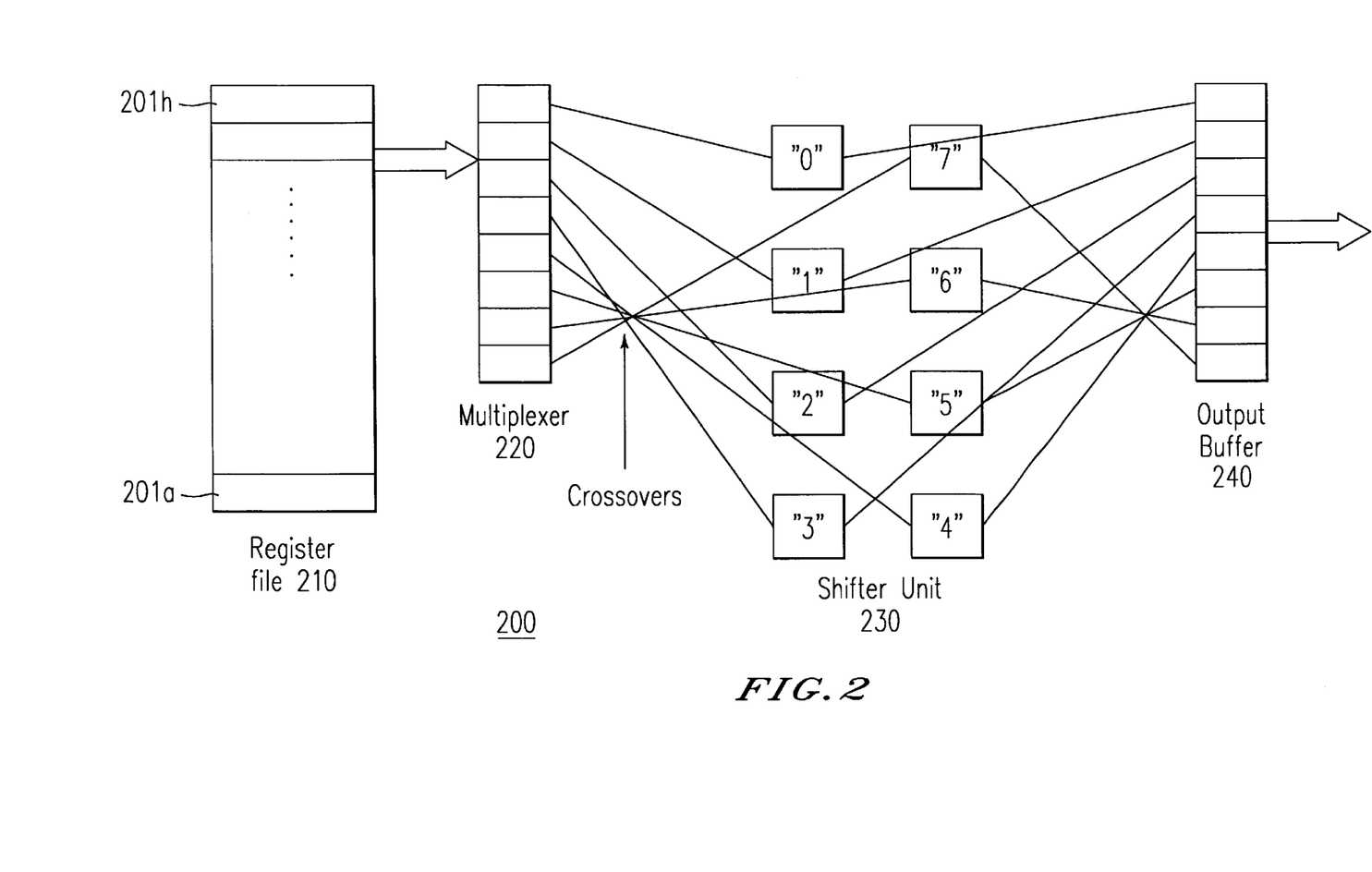
FIG. 2 shows a block diagram illustrating a simplified conventional shifter system.

FIG. 2 shows a block diagram illustrating a simplified conventional shifter system 200. The system 200 as shown comprises a register file 210 coupled to a shifter unit 230 through a multiplexer 220 Operand(s) is then retrieved from the register file 210 and provided to the shifter unit 230 for data bits shifting or rotating. In the system 200 as shown, the register file 210 comprises a plurality of registers 201a ... n. For example, in the Intel (TM) x86 platform, the register file 210 comprises 8 independent registers. Each of the registers comprises a data word operand for inputting to the shifter unit 230. Generally, at least one multiplexer 220 is connected to the register file 210 for selecting at least one operand for the shifter unit 230. As shown in the figure, the shifter unit 230 is similar to the circular shifter design 100 as shown in FIG. 1. As it can be easily seen in the figure, there are undesirable routing crossovers between the multiplexer 220 connecting the register file 210 to the shifter unit 230. Specifically, the connections between the less significant portion of the data word operand and the shifter unit crossover the connections between the more significant portion of the data word operand and the shifter unit. Hence, this system 200 creates tremendous problem for data lines routing.

Figure 3:
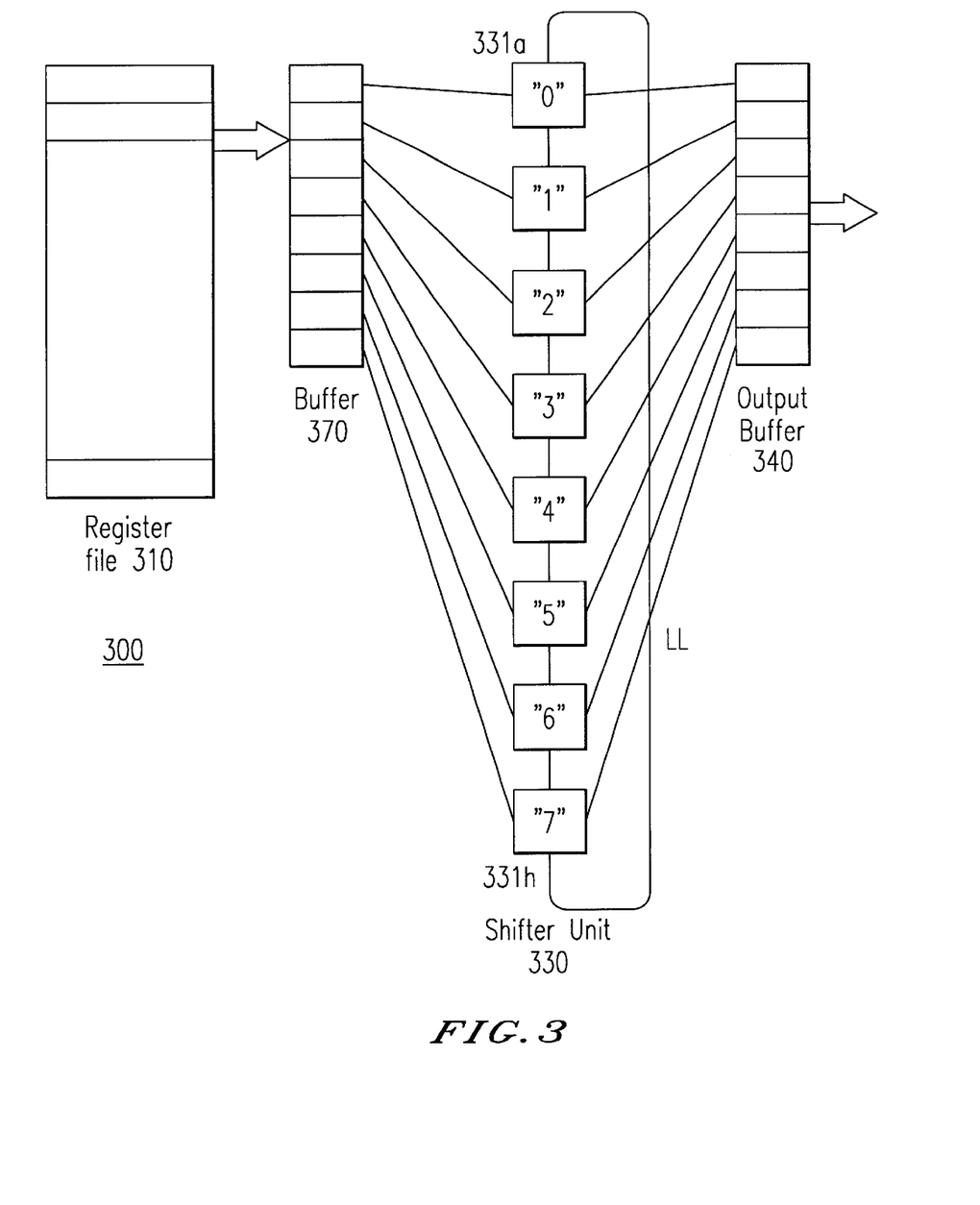
FIG. 3 shows a block diagram illustrating another simplified conventional shifter system.

FIG. 3 shows a block diagram illustrating another simplified conventional shifter system 300. Similar to the shifter system 200 as shown in FIG. 2, the system 300 a comprises a register file 310, a multiplexer 320, a shifter unit 330, and an output buffer 230. However, the shifter system 300 as shown employs a linear shifter unit 230 where the shifter unit 230 is layout in a linear fashion. That is, the most significant bit portion and the least significant bit portion are placed on opposite ends of the shifter unit 330. By placing the shifter unit 330 as shown, the routing crossovers from the multiplexer 320 to the shifter unit 330 are eliminated. Similarly, the routing crossovers from the shifter unit 330 and the output buffer 340 are also eliminated. However, the problem of this design is the connection between the most significant portion 331h and the least significant portion 331a. Because of the need to shift data bits between the most significant portion 331h and the least significant portion 331a, a long routing data line is needed in the linear shifter unit 330 as shown. This long routing data line is indicated as "LL" in FIG. 3. As shown in the figure, this long routing data line LL crossovers every data line in the shifter unit. Thus this line creates tremendous routing problems.

Figure 4:
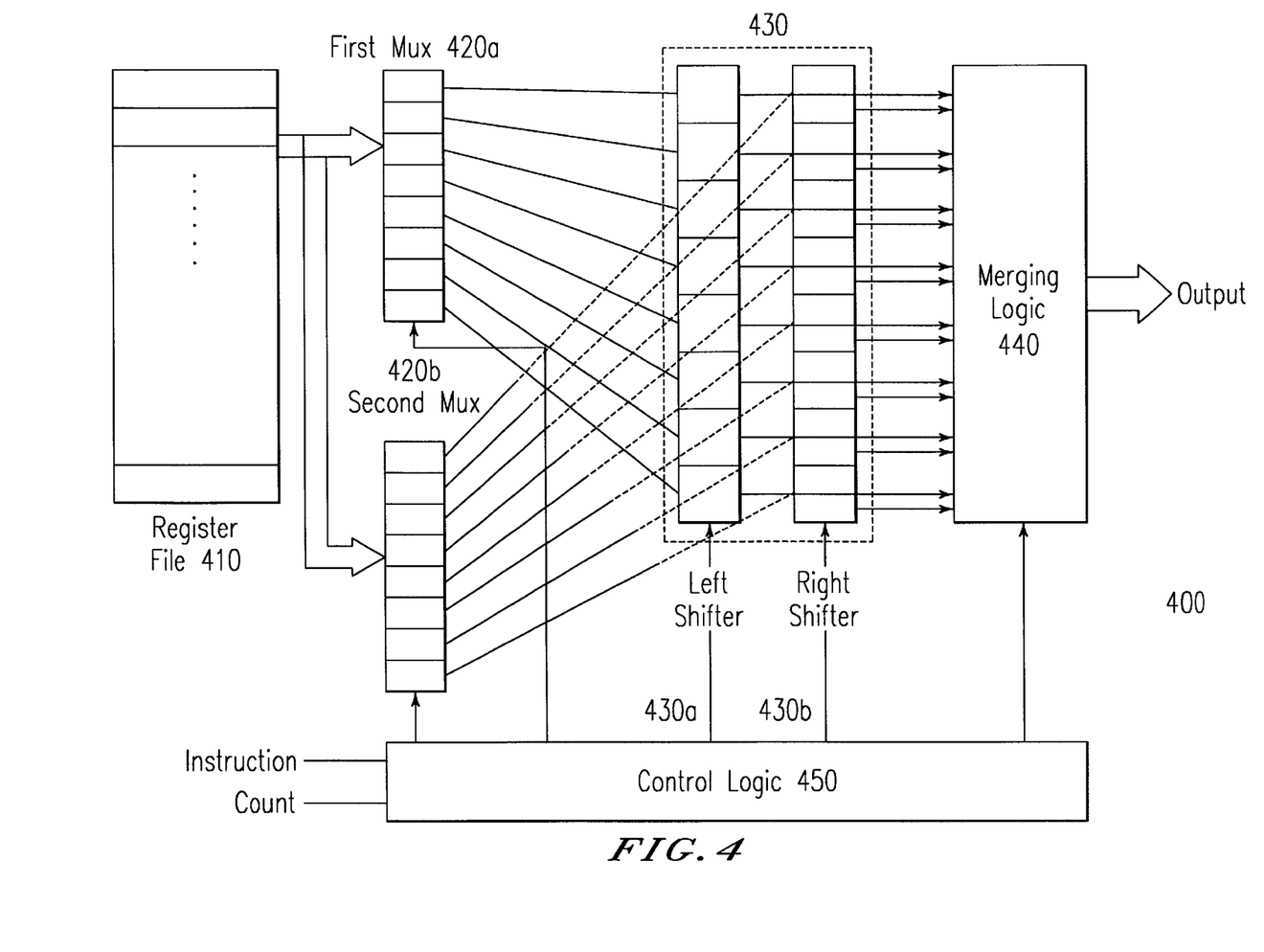
FIG. 4 illustrates the preferred embodiment of a shifter system according to the present invention.

FIG. 4 illustrates a preferred embodiment of a shifter system according to the present invention.

The shifter system 400 as shown comprises a register file 410 similar to the register file as shown in FIG. 2. In this embodiment, instead of using one complicated shifter unit, two independent shifters (i.e. a left shifter 430a and a right shifter 430b) are used as part of the shifter unit 430. Each of the shifters 430a,430b is coupled to a multiplexer 420a or 420b for selecting an input operand from the register file 410. Thus each of the two multiplexers 420a,420b is responsible for selecting and providing one operand for its corresponding shifter 430a,430b. Specifically, the first multiplexer 420a coupled to the left shifter 430a is used to select an input operand for the left shifter 430a, whereas the second multiplexer 420b coupled to the right shifter 430b is used to select an input operand for the right shifter 430b. Furthermore, the results (i.e. left shifted data word, right shifted data word) of these two shifters 430a,430b are then fed to the merging logic to generate the output shifted/ rotated result. In addition, the shifter system 400 as shown also comprises a control logic 450 for generating different control signals for various components in the system. According to the present invention, the control logic 450 is provided with an instruction type and a count. The instruction type represents the type of the shift or rotate instruction being processed, whereas the count indicates the number of shift or rotate required for the instruction.

As described in the previous paragraphs, some shift and/or rotate instructions such as SHL, SAL, SHR, SAR, ROL, ROR, RCL, and RCR requires only one operand (i.e. source operand). Each of the results of these shift and rotate functions is stored in an output operand (i.e. destination operand). Since only one operand is needed for the shifter unit, either one, or both, of the multiplexers 420a,420b is used for selecting the source operand from the register file 410 for the shifter unit 430.

On the other hand, some shift instructions such as SHLD and SHRD require two distinct operands (i.e. the destination operand and the source operand) in addition to the count operand. Instead of providing one operand to both of the shifters as in the SHL and SHR instructions, each of the two shifters 430a,430b is provided with an independent input operand. Thus, each of the two multiplexers 420a,4320b is responsible to provide one distinct operand to its corresponding shifter 430a or 430b.

In the preferred embodiment as shown, the left shifter 430a is provided with a left shift input data word from the first multiplexer 420a, whereas the right shifter 430b is provided with a right shift input data word from the second multiplexer 420b. According to the present invention, each of these two shifters 430a,430b is arranged in a linear structural format, instead of arranged in two circular structures as with the shifter 100 as shown in FIG. 1. Specifically, each of these two shifters 430a,430b is designed for shifting function only. Since these two shifters 430a,430b are not required to perform any rotate function, the shifters 430a,430b are not required to be layout in a circular fashion as discussed with FIG. 1. Thus, the chip layout of the two shifters is straightforward and the routings between the two multiplexers 420a,420b and each of the two shifters 430a,430b can be greatly simplified. FIG. 3 shows minimal routing crossovers occurred in each of the data bit connection between the multiplexers 420a,420b and the shifters 430a,430b.

As mentioned above, the system 400 according to the present invention further comprises merging logic 440 for combining the two output results from the two shifters (i.e. the left shifter 430a and the right shifter 430b). Specifically, the merging logic 440 performs Boolean operations on the two results provided by these two shifters 430a,430b to generate the output result. In addition, as shown in the figure, the control logic 450 generates different control signals to control the operations of different components in the shifter system 400.

In the preferred embodiment, the left shifter 430a shifts the input data word by a left shift amount depending on the instruction. For example, in a 8-bit data word, the input data word can be shifted left for any number of bits between 0 and 7 and generates a left shifted data word. Likewise, the input data word can also be shifted right by the right shifter 430b for any number of bits between 0 and 7 and generates a right shifted data word. Both the left shifted data word and the right shifted data word are then provided to the merging logic 440 for further processing. Specifically, the merging logic 440 performs Boolean operations on the two shifted data words to generate the output result.

According to the preferred embodiment of the present invention, the system 400 as shown is able to handle all of the following Intel defined instructions: SHL shift left, SHR shift right, SAR shift extended right, ROL rotate left, ROR rotate right, RCL rotate carry left, RCR rotate carry right, SHLD shift left double, SHRD shift right double, BT bit test, BTC bit test and complement, BTR bit test and reset, and BTS bit test and set. However, it should be noted that the present invention is not limited to only Intel (TM) x86 based instructions. Since the examples described in this specification are for illustration purposes only, other data word shifting and rotating instructions can be implemented accordingly. Furthermnore, in the preferred embodiment according to the present invention, each of the above-mentioned instructions can be implemented using the system as shown in FIG. 3. The followings describe the detail operations of each of the 10 instructions.

1. SHL shift left

The implementation of the SHL shift left instruction is straight forward, where the source operand is provided to the left shifter 430a for left shifting. The right shifter 430b is therefore unused. The amount of left shift is provided by the count operand of the instruction issued. After the left shift is performed on the source operand, the merging logic 440 selects the result (i.e. left shifted data word) from the left shifter 430a as the output. According to this embodiment of the present invention, the result provided by the right shifter 430b is considered as "don't care" (hereinafter "x"). The following shows the detail operations of the handling of the SHL left shift instruction: SHL [H G F E D C B A],3

| Carry | Left Shifter (LSH) | Right Shifter (RSH) | |
|---|---|---|---|
| Ca | H G F E D C B A | x x x x x x x x | before shifting |
| Ca | D C B A 0 0 0 0 | x x x x x x x x | after shifting |

The merging logic 440 selects the result from the left shifter 430a as the output.

Output=LSH=D C B A 0000

It should be noted that the least 3 significant bits of the output are packed with zeroes.

2. SHR shift right

The implementation of the SHR shift right instruction is also straight forward, and is similar to the SHL shift left instruction. In the preferred embodiment, the source operand is provided to the right shifter 430b for right shifting. The left shifter 430a is unused. The amount of right shift is defined by the count operand as provided in the instruction. After the right shift is performed on the source operand, the merging logic 440 selects the right shifted data (i.e. right shifted data word) from the right shifter 430b as the output. According to this preferred embodiment, the left shifted data word provided by the right shifter 430b is considered as "don't care." The following shows the detail operations of the SHR shift right instruction: SHR [H G F E D C B A], 3

| Carry | Left Shifter | Right Shifter | |
|---|---|---|---|
| C | x x x x x x x | H G F E D C B A | before shifting |
| C | x x x x x x x | 0 0 0 H G F E D | after shifting |

The merging logic 440 selects the result from the right shifter 430b as the output.

Output=RSH=0 0 0 H G F E D C

It should be noted that the three most significant bits of the output are packed with zeroes.

3. SAL Shift Arithmetic Left

As defined in the Intel instruction set, the operation of the SAL shift arithmetic left instruction is identical to the operation of the SHL shift left instruction. Thus, the shifter unit performs identical steps as described above. The following shows the detail operations of the SAL Shift Arithmetic Left instruction: SAL[H G F E D C B A],3

| Carry | Left Shifter | Right Shifter | |
|---|---|---|---|
| Ca | H G F E D C B A | x x x x x x x x | before shifting |
| Ca | E D C B A 0 0 0 | x x x x x x x x | after shifting |

The merging logic 440 selects the result from the left shifter 430a as the output.

Output=LSH=E D C B A 0 0 0

Similar to the SHL shift left instruction, the three least significant bits are packed with zeroes.

4. SAR Shift Arithmetic Right

The implementation of SAR shift arithmetic right instruction is similar to the implementation of SHR shift right instruction. Thus, the left shifter 430a is unused and the source operand is provided to the right shifter 430b for right shift. After the source operand is right shifted, the merging logic 440 selects the result from the right shifter 430b as the output. In addition, instead of simply packing zeroes on the most significant bits such as the implementation of SHR, the most significant bits of the right shifted data word are packed with the carry bit. The following shows the detail operation of the SAR shift arithmetic right instruction: SAR[H G F E D C B A],3

| Carry | Left Shifter | Right Shifter | |
|---|---|---|---|
| Ca | x x x x x x x x | H G F E D C B A | before shifting |
| Ca | x x x x x x x x | H H H H G F E D | after shifting |

The merging logic 440 selects the result from the right shifter 430b as the output.

Output=RSH=H H H G F E D

It should be noted that the three most significant bits of the output are packed with the most significant bit of the source operand.

5. ROL Rotate Left

The implementation of the ROL rotate left instruction requires both the left shifter 430a and the right shifter 430b. In this embodiment, both of the two shifters are provided with the source operand. Then, the right shifter 430b shifts the source operand by a first number, where the first number is the count operand as defined in the instruction. The left shifter 430a shifts the source operand by a second number, where the first number plus the second number equals to the number of bits of the source operand (in this case: 8). After both two shifted results are generated by the left shifter 430a and the right shifter 430b, the merging logic 440 performs logic operations on the results produced by the two shifters. Specifically, the merging logic 440 generates the output by ORing the left shifted data word with the right shifted data word. In addition, it should be noted that for the ROL rotate left instruction, the original value of the CF flag is not a part of the result, but the CF flag receives a copy of the bit that was shifted from one end to the other. Thus, the merging logic 440 also copies the most significant bit from the output data word to the carry bit. The following shows the detail operations of the ROL rotate left instruction: ROL [H G F E D C B A],3:

| Carry | Left Shifter | Right Shifter | |
|---|---|---|---|
| Ca | H G F E D C B A | H G F E D C B A | before shifting |
| C | C B A 0 0 0 0 0 | 0 0 0 H G F E D | after shifting |

The merging logic 440 performs OR operations on the two results produced by the left shifter 430a and the right shifter 430b as the output.

| | Output shifter] | = [result from the left shifter] OR [result from the right = C C B A H G F E D |
|---|---|---|

6. ROR Rotate Right

The implementation of the ROR rotate right instruction is very similar to the implementation of the ROL rotate left instruction. The ROR rotate right instruction also uses both the left shifter 430a and the right shifter 430b. Both of the two shifters are provided with the source operand. However, instead of left shifting the source operand by the count operand position, the source operand is right shifted by a first number equals to count operand. Simultaneously, the left shifter 430a shifts the source operand by a second number, where the second number plus the count equals to the number of bits of the source operand (in this case: 8). After the left shifted data word and the right shifted data word are generated by the left shifter 430a and the right shifter 430b respectively, the merging logic 440 performs logic operations on the results from the two shifters. Specifically, the merging logic 440 generates the output by ORing the left shifted data word and the right shifted data word to form the output. In addition, it should be noted that for the ROR rotate left instruction, the original value of the CF flag is not a part of the result, but the CF flag receives a copy of the bit that was shifted from one end to the other. Thus, the merging logic 440 copies the most significant bit of the output data word to the carry bit. The following shows the detail operations of the ROR rotate right instruction: ROR [H G F E D C B A],3

| Carry | Left Shifter | Right Shifter | |
|---|---|---|---|
| Ca | H G F E D C B A | H G F E D C B A | before shifting |
| C | C B A 0 0 0 0 0 | 0 0 0 H G F E D | after shifting |

The merging logic 440 performs OR operations on the results produced by the left shifter 430a and the right shifter 430b to form the output.

| | Output shifter] | = [result from the left shifter] OR [result from the right = C C B A H G F E C |
|---|---|---|

7. RCL Rotate Carry Left

The implementation of the RCL rotate carry left instruction is very similar to the implementation of the ROL rotate left instruction. The RCL rotate carry left instruction requires both the left shifter 430a and the right shifter 430b. Both of the two shifters are provided with the source operand. Specifically, the left shifter 430a shifts the source operand by a first number, where the first number is the count as defined in the instruction. The right shifter 430b shifts the source operand by a second number, where the second number equals to the number of bits of the source operand (in this case: 8) minus (the count−1). In addition, the carry bit of the original source operand is used by the left shifter 430a as the first bit to be shifted into the source operand. After the left shifted data word and the right shifted data word are generated, the merging logic 440 performs logic operations on the two shifted data words. Specifically, the merging logic 440 generates the output by performing OR operations on the left shifted data word and the right shifted data word. In addition, the RCL rotate carry left instruction shifts the most-significant bit into the CF flag. Thus, the merging logic 440 copies the last most significant bit shifted out from the left shifter 430a to the carry bit of the output data word. The following shows the detail operations of the RCL rotate carry left instruction: RCL [H G F E D C B A],3

| Carry | Left Shifter | Right Shifter | |
|---|---|---|---|
| Ca | H G F E D C B A | H G F E D C B A | before shifting |
| F | E D C B A Ca 0 0 | 0 0 0 0 0 0 H G | after shifting |

The merging logic 440 performs OR operations on the two results produced by the left shifter 430a and the right shifter 430b to form the output

| | Output | = [result from the left shifter] OR [result from the right shifter] |
|---|---|---|
| | | = F   E D C B A Ca H G |

It should be noted that the number [8 (number of bits of the source operand)−3 (count position)+1] of the output equals to the carry bit of the original source operand.

8. RCR Rotate Carry Right

The implementation of the RCR rotate carry right instruction is very similar to the implementation of the ROR rotate right instruction. Thus, the RCR rotate carry right instruction requires both the left shifter 430a and the right shifter 430b. Both of the two shifters are provided with the source operand. Specifically, the right shifter 430b shifts the source operand by a first number, where the first number equals to the count operand as defined in the instruction. The left shifter 430a shifts the source operand by a second number, where the second number equals to the number of bits of the source operand minus (the count−1). In addition, the carry bit of the original source operand is used by the right shifter 430b as the first bit to be shifted into the source operand. After the left shifted result and the right shifted result are generated, the merging logic 440 performs logic operations on the two shifted data words. Specifically, the merging logic 440 generates the output by performing OR operations on the left shifted data word and the right shifted data word. In addition, the RCR rotate carry right instruction shifts the least-significant bit into the CF flag. Thus, the merging logic 440 copies the last least significant bit shifted out from the right shifter 430b to the carry bit of the output data word. The following shows the detail operations of the RCR rotate carry right: RCR [H G F E D C B A],3

| Carry | Left Shifter | Right Shifter | |
|---|---|---|---|
| Ca | H G F E D C B A | H G F E D C B A | before shifting |
| C | B A 0 0 0 0 0 0 | 0 0 Ca H G F E D | after shifting |

The merging logic 440 performs OR operations on the results of the left shifter 430a and the right shifter 430b to form the output.

| | Output | = [result from the left shifter] OR [result from the right shifter] |
|---|---|---|
| | | = C   B A Ca H G F E D |

It should be noted that the number [count position] bit of the output equals to the carry bit of the original source operand.

9. SHRD Double Precision Shift Right

To implement this instruction, both shifters are used. Specifically, the right shifter 430b is provided with the first operand (i.e. destination operand), whereas the left shifter 430a is provided with the second operand (i.e. source operand). First, the destination operand is shifted right for a first number position as defined by the count operand of the instruction. Then, the second operand is shifted left for the second number position, where the second number position equals to the number of data bits of the first operand minus the first number. Both the left shifted data word and the right shifted data word are provided to the merging logic 440 for logical operation. Specifically, the merging logic 440 generates the output by performing OR operations on the two shifted data word. The following shows the detail operations the SHRD double precision shift right instruction: SHRD [H G F E D C B A],[h g f e d c b a],3

| Carry | Left Shifter | Right Shifter | |
|---|---|---|---|
| Ca | h g f e d c b a | H G F E D C B A | before shifting |
| Ca | c b a 0 0 0 0 0 | 0 0 0 H G F E D | right shifting |

The merging logic 440 performs OR operations on the results of the left shifter 430a and the right shifter 430b to form the output.

| Output = [c b a 0 0 0 0 0] OR [0 0 0 H G F E D] |
|---|
| = c b a H G F E D |

10. SHLD Double Precision Shift Left

To implement this instruction, both shifters are used. Specifically, the left shifter 430a is provided with the first operand (i.e. destination operand), whereas the right shifter 430b is provided with the second operand (i.e. source operand). First, the destination operand is shifted left for a first number position as defined by the count operand of the instruction. Then, the second operand is shifted right for the second number position, where the second number position equals to the number of data bits of the first operand minus the first number. Both the left shifted data word and the right shifted data word are then provided to the merging logic 440 for logical operation. Specifically, the merging logic 440 generates the output by performing OR operations on the two shifted data word. The following shows the detail operations the SHLD double precision shift right instruction:
SHLD [H G F E D C B A],[h g f e d c b a],3

| Carry | Left Shifter | Right Shifter | |
|---|---|---|---|
| Ca | H G F E D C B A | h g f e d c b a | before shifting |
| Ca | E D C B A 0 0 0 | 0 0 0 0 0 h g f | after shifting |

The merging logic 440 performs OR operations on the results of the left shifter 430a and the right shifter 430b to form the output.

| Output = [E D C B A 0 0 0] OR [0 0 0 0 0 h g f] |
|---|
| = E D C B A h g f |

11. BT Bit Test; BTC Bit Test and Complement; BTR Bit Test and Reset; and BTS Bit Test and Set (i.e. BTx instruction)

Each of the above four bit test instructions can also be implemented using the present invention. According to the present invention, the first step of handling a bit test type instruction BTx (BT, BTC, BTR, or BRS) is to rotate the designated bit out to the CL register. Thus, the implementation of the first step is similar to the above-discussed Rotate Carry Right RCR instruction. The number of bits (i.e. count) for the right rotate operation is defined by an offset operand. That is, the number of bits (i.e. count) for the right rotate equals to the value of the offset operand plus one. By rotating the bit string by count number of bits, the requested bit is then available in the CL register for output.

Depending on the instruction type, the data value in the CL register is then unchanged, set, reset, or complemented. For the Bit Test BT instruction, the data in the CL register remains unchanged. For the Bit Test and Complement BTC instruction, the data in the CL register is then complemented. For the Bit Test and Reset BTR instruction, the data in the CL register is then reset. Finally, for the Bit Test and Set BTS instruction, the data in the CL register is then set.

After the data value in the CL register is output and processed, the resulting rotated bit string is then fed back to the shifter unit 430 for reverse rotating. Particularly, the implementation of this step is similar to the above-discussed Rotate Carry Left RCL instruction. The number of bits (i.e. count) in this step for the left rotate operations is same as the count used in the first step. That is, number of bits (i.e. count) for the left rotate equals to the value of the offset operand plus one. By left rotating the bit string by the count number of bits, the original bit string is regenerated except the data bit indexed by the count because this data bit was complemented, set, reset, or untouched depending on the type of instruction as discussed in the previous paragraphs. The following three steps show the detail operations of the Bit Test (e.g. unchanged, Complemented, Set, or Rest): BTx [H G F E D C B A],3

First Step (Rotate Carry Right for 3 Positions):

| Carry | Left Shifter | Right Shifter | |
|---|---|---|---|
| Ca | H G F E D C B A | H G F E D C B A | before shifting |
| C | B A 0 0 0 0 0 0 | 0 0 Ca H G F E D | after shifting |

The merging logic 440 performs OR operations on the results of the left shifter 430a and the right shifter 430b to form the output.

| Intermediate result = [result from the left shifter] OR [result from the right shifter] |
|---|
| = C B A Ca H G F E D |

Second Step (Output Carry Bit and Perform Operation on Carry Bit):

After the first step is completed, the data value in the CL flag is output. Then, the data value of the CL flag is then complemented, set, reset, or unchanged accordingly (i.e. to the value "x").

Third Step (Rotate Carry Left for 3 Positions):

| Carry | Left Shifter | Right Shifter | |
|---|---|---|---|
| x | B A Ca H G F E D | B A Ca H G F E D | before shifting |
| Ca | H G F E D x 0 0 | 0 0 0 0 0 0 B A | after shifting |

The merging logic 440 performs OR operations on the two results produced by the left shifter 430a and the right shifter 430b to form the output

| Output = [result from the left shifter] OR [result from the right shifter] |
|---|
| = Ca H G F E D x B A |

It should be noted that the third bit (as defined by the index operand) of the resulting bit string is either complemented, set, reset, or unchanged depending on the instruction type.

Figure 5:
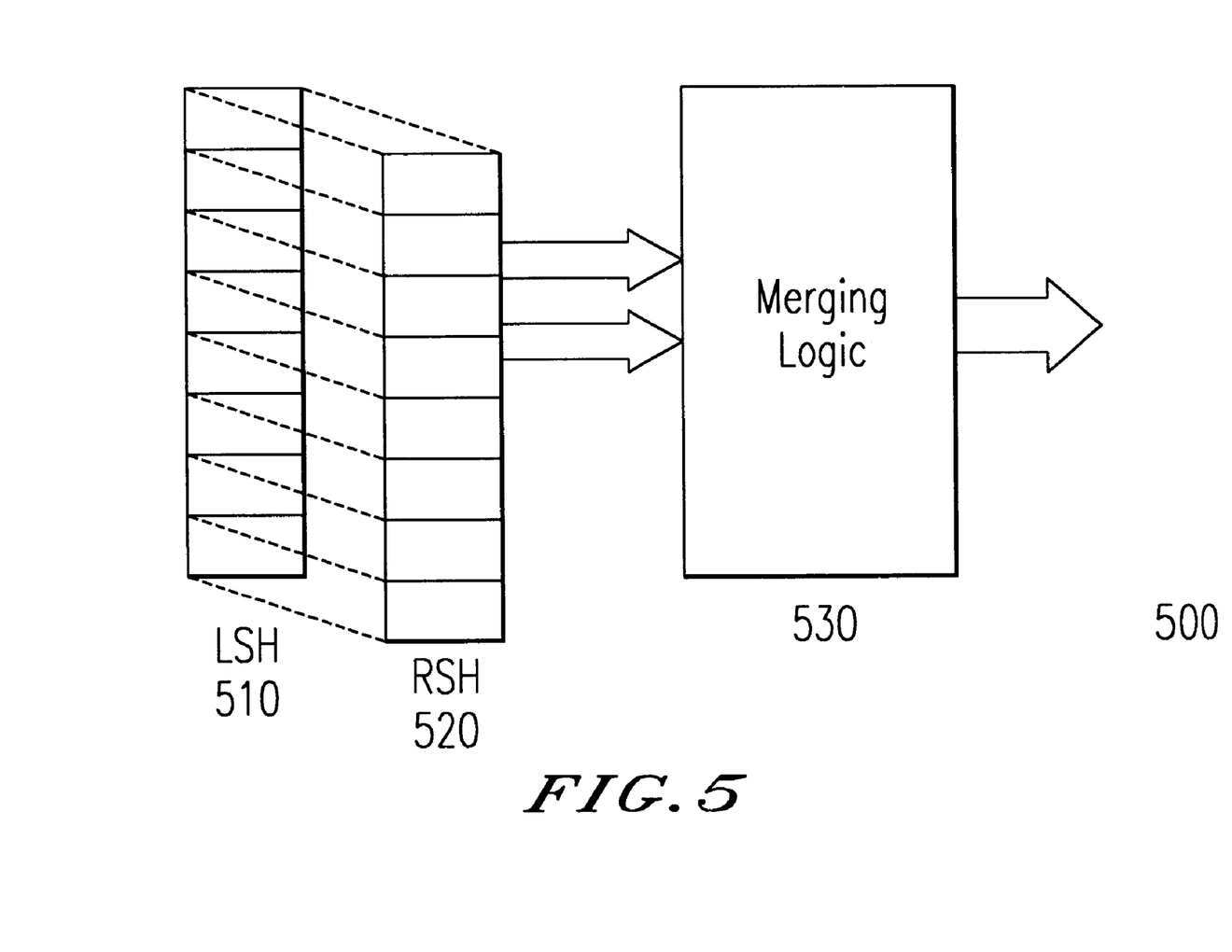
FIG. 5 is a block diagram showing the layout of a preferred embodiment of a simplified shifter unit according to the present invention.

FIG. 5 is a block diagram showing the layout of a preferred embodiment of a simplified shifter unit 500 according to the present invention.

As described in the previous paragraphs, the preferred embodiment of the shifter unit 500 comprises three major components: a left shifter 510, a right shifter 520 and merging logic 530 Each of the two shifters 510,520 is provided with an operand selected by its corresponding multiplexer (not shown) coupled to the register file (not shown). Based on the instruction type, either one or two of the two shifters 510,520 are used for the execution for the current instruction. In addition, the two operands provided to the two shifters 510,520 can be identical or from different locations of the register file.

It is preferably that, as shown in the figure, the right shifter 510 and the left shifter 520 overlay in a same layout area of the chip location. Specifically, the two shifters 510,520 are layout in an area close to the register file output, or the multiplexers coupling to the output of the register file. Since each of the two shifters 510,520 is not required to perform any rotation function as discussed with FIG. 2, each of the two shifters 510,520 can be layout in a linear fashion. By laying out the two shifters 510,510 in a linear fashion, the routing connections between the multiplexers and each of the shifters 510,520 can be greatly simplified. Furthermore, in this preferred embodiment, the merging logic 530 of the bit shifter unit 500 is located around the output of the two shifters 510,520 so that the routings between the two shifters 510,520 and the merging logic 530 can be greatly simplified.

Figure 6:
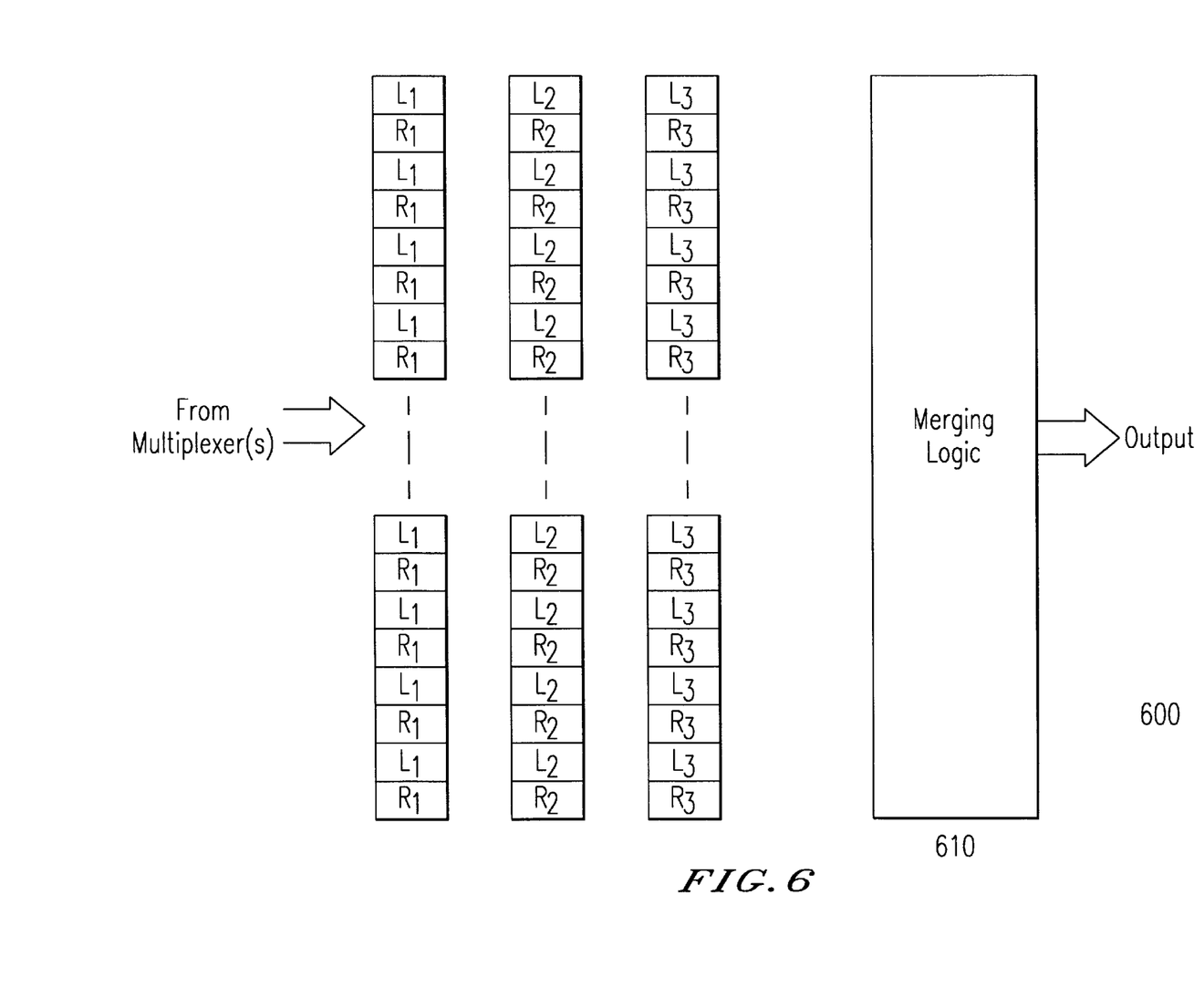
FIG. 6 shows a more detailed layout of a preferred embodiment of the shifter unit according to the present invention.

FIG. 6 shows a more detailed layout of a preferred embodiment of the shifter unit 600 according to the present invention. In order to balance between performance and design complexity, each of the two shifters is divided into multiple levels. For example, in the preferred embodiment as shown, each of the left shifter and the right shifter comprises three levels: L1, L2 and L3 for the left shifter, where R1, R2 and R3 for the right shifter. In addition, as shown in the figure, each level of the shifter comprises a plurality of components. In the preferred embodiment as shown, each component is a multiplexer. It should be noted that the number of multiplexers in each level equals to the number of bits for each data word. For example, in a 32-bit shifter, each level comprises 32 multiplexers. That is, for a 32-bit shifter, there are 32 multiplexers for L1 and R1, 32 multiplexers for L2 and R2, and 32 multiplexers for L3 and R3.

Assuming data of the shifter unit as shown in FIG. 6 flows from the left side to the right side. Thus, each of the two shifters is placed interleavingly in a sequential fashion from left to right. By laying out these two shifters according to the figure as shown, the routings between different levels of the shifters can be simplified so that the number of crossover data lines can be greatly reduced. Furthermore, as shown in the figure, the merging logic 610 is placed near the final level of the two shifters such the logic operations can be performed on the two shifted results near the final stage of each shifter without long routing lines.

Figure 7:
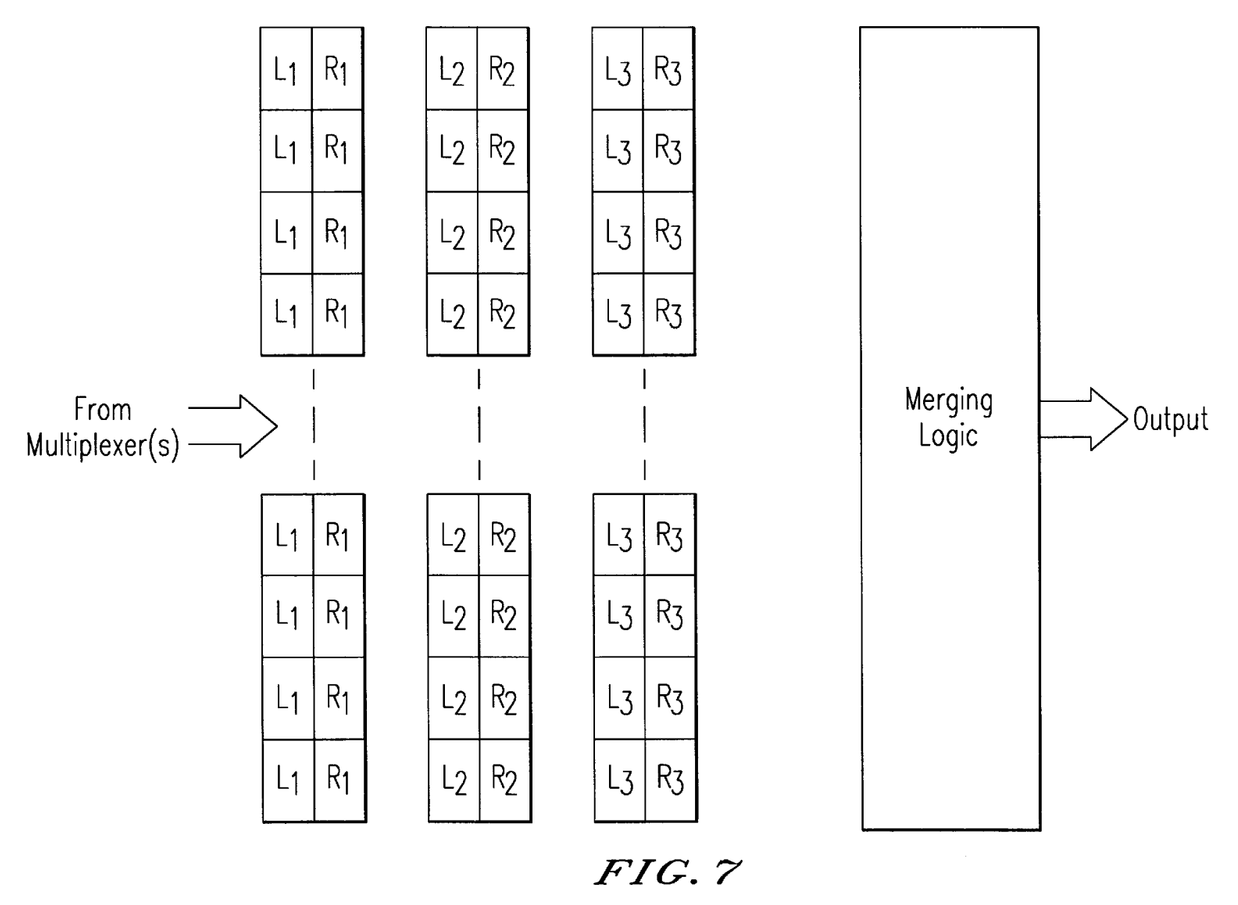
FIG. 7 shows a preferred embodiment of one of the two shifters according to the present invention.

FIG. 7 shows a detailed layout of another preferred embodiment of the shifter unit according to the present invention. In this embodiment, each level of the right shifter (i.e. R1, R2, and R3) is placed following the corresponding level of the left shifter (i.e. L1, L2, and L3).

Figure 8:
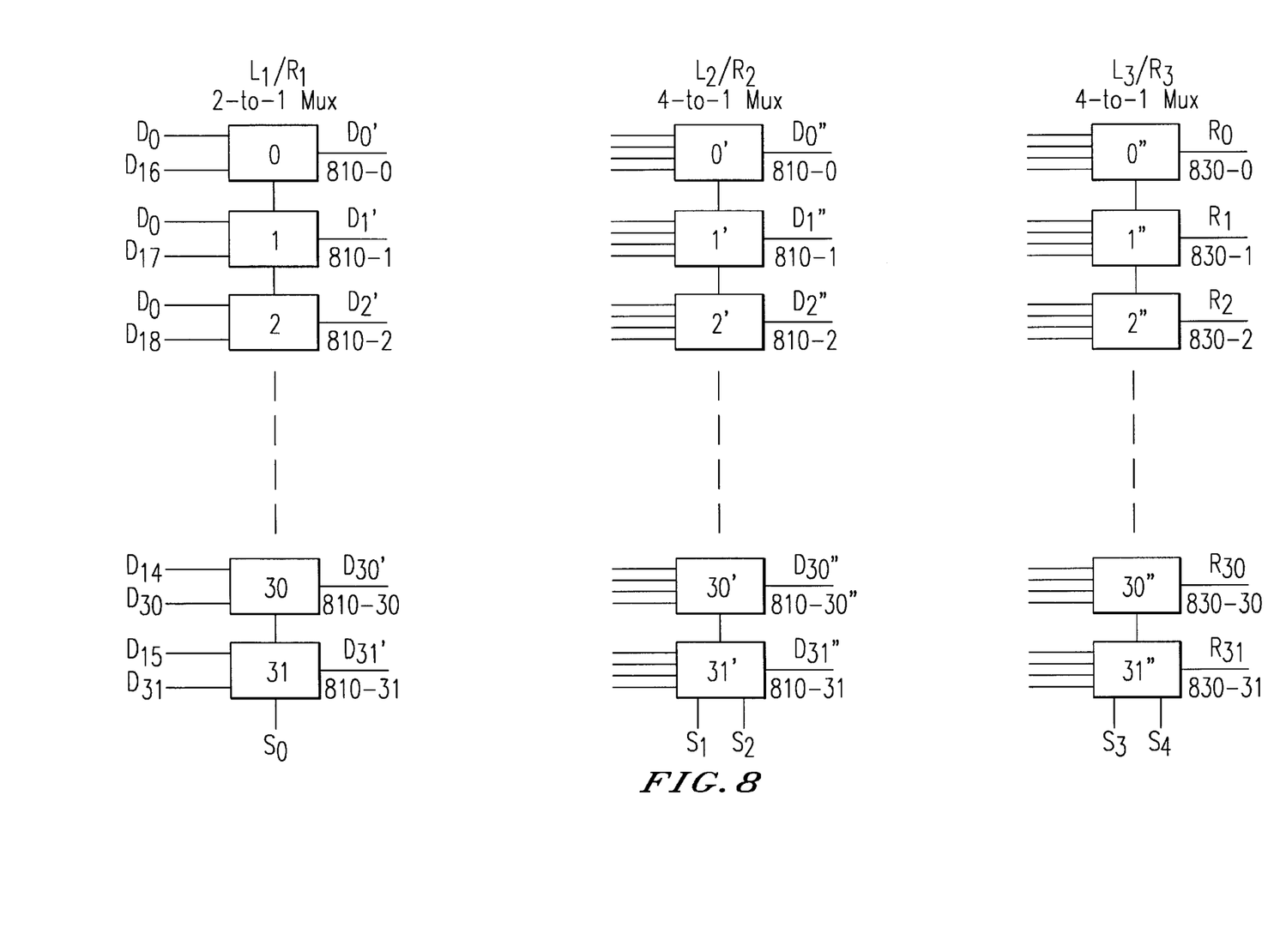
FIG. 8 shows a detailed layout of another preferred embodiment of the shifter unit according to the present invention.

FIG. 8 shows a preferred embodiment of one of the two shifters according to the present invention. The shifter as shown in designed for processing a 32-bit data. As discussed above, each shifter comprises three levels: the first level (i.e. L1 or R1), the second level (i.e. L2 or R2) and the third level (i.e. L3 or R3). In this embodiment, each of the multiplexers in the first stage is a 2-to-1 multiplexer (i.e. 810-0,1,2 . . . 31). Thus, thirty two 2-to-1 multiplexers 810-0,1 . . . 31 are shown in the first level of the shifter. Furthermore, thirty two 4-to-1 multiplexers are used in the second (i.e. 820-0,1,2 . . . 31) and the third (i.e. 830-0,1,2 . . . 31) stages. By combining these three levels, a full 32-bit shifter is created. The data line connections are shown in the figure. As shown in the figure, a control line S0 is provided to each of the multiplexers in the first level (i.e. 810-0,1,2 . . . 31) for controlling the operation of each multiplexer in the first level. In addition, two control lines S1,S2 are provided to each of the multiplexers in the second level (i.e. 820-0,1,2 . . . 31) for controlling the operation of each multiplexer in the second level. Similarly, two control lines S3,S4 are provided to each of the multiplexers in the third level (i.e. 830-0,1,2 . . . 31) for controlling the operation of each multiplexer in the third level. By using these five control lines S0,S1,S2,S3,S3, any shifting combination of a 32-bit shifter can be implemented.

It should also be noted that this preferred embodiment is separated into these three levels (i.e. 2-to-1 multiplexers for the first level, 4-to-1 multiplexers for the second level, 4-to-1 multiplexers for the third level) to reduce capacitive loading on the control line(s) in the first level, and thus increase the speed of these three level shifter combination.

However, it should be also noted that the shifter according to the present invention can be designed in any combinations such as using different number of levels, or using different kind of multiplexers in each level. For example, the shifter can be divided into three levels as follows: thirty two 4-to-1 multiplexers for the first level, thirty two 4-to-1 multiplexers for the second level, and thirty two 2-to-1 multiplexers for the final third level. However, as we have discussed above, this method might suffer timing penalty because of high input capacitance loading on the first level.

Furthermore, the shifter can also be implemented using 2 levels only. In this embodiment, the first level can be implemented using 8-to-1 multiplexers, where the second level can be implemented using 4-to-1 multiplexers. Thus, a 32-bit shifter can be implemented.

Figure 9:
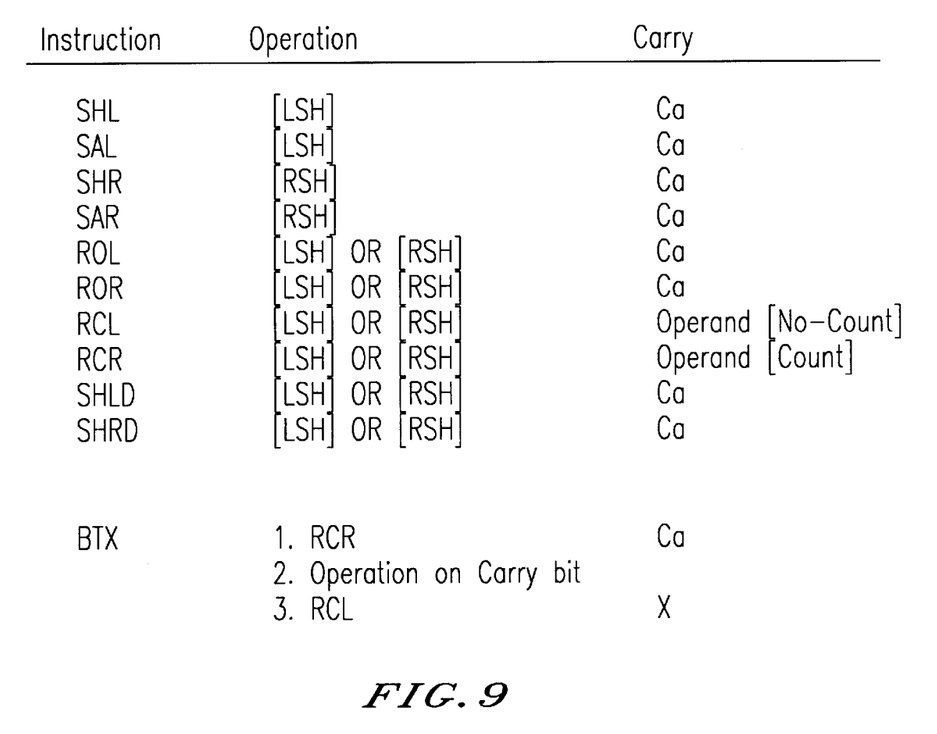
FIG. 9 summarizes the operations of the control logic according to the present invention.

FIG. 9 summarizes the operations of the merging logic 440 according to the present invention.

The first column of FIG. 9 lists the type of instruction handled by the preferred embodiment of the present invention. As discussed above, the instruction list comprises: SHL shift left, SAL shift arithmetic left, SHR shift right, SAR shift arithmetic right, ROL rotate left, ROR rotate right, RCL rotate through carry left, RCR rotate through carry right, SHLD double precision shift left, SHRD double precision shift right, BT bit test, and BTX various kinds of bit test and test/reset/complement.

As shown in the table, the merging logic generates the left shifted data word provided by the left shifter as the output for the SHL and SAL instructions. The right shifted data word from the right shifter is output by the merging logic for the SHR and SAR instructions. In addition, the merging logic performs the Boolean operation OR on the left shifted data word and the right shifted data word to generate the output for the instructions ROL, ROR, RCL, RCR, SHLD, and SHRD.

It is to be understood that while the invention has been described above in conjunction with preferred specific embodiments, the description and examples are intended to illustrate and not limit the scope of the invention, which is defined by the scope of the appended claims.

What is claimed is:

1. A shifter unit for relocating data bits in response to a requested instruction, comprising:

a left shifter configured to left shift a left shift input data word for a left shift amount to produce a left shifted data word;

a right shifter configured to right shift a right shift input data word for a right shift amount to produce a right shifted data word; and a control logic coupled to said left shifter and said right shifter and configured to perform an OR operation on said right shifted data word and said left shifted data word to form an output result.

2. The shift unit according to claim 1, further comprising:

a register file comprising a plurality of operands;

a first multiplexer coupled to said register file and configured to select said left shift input data word for said left shifter; and a second multiplexer coupled to said register file and configured to select said right shift input data word for said right shifter.

3. The shifter unit according to claim 1, wherein when said requested instruction is a left shift instruction of an input data word, said left shift input data word is said input data word, and said output result is said left shifted data word.

4. The shifter unit according to claim 1, wherein when said requested instruction is a right shift instruction of an input data word, said right shift input data word is said input data word, and said output result is said right shifted data word.

5. The shifter unit according to claim 1, wherein when said requested instruction is a rotate instruction of an input data word, said left shift input data word and said right shift input data word are said input data word.

6. The shifter unit according to claim 5, wherein when said rotate instruction is a rotate right instruction for a count position, said right shift amount is said count position and said left shift-amount equals a bit width of said input data word minus said count position.

7. The shifter unit according to claim 5, wherein when said rotate instruction is a rotate left instruction for a count position, said left shift amount is said count position and said left shift amount equals a bit width of said input data word minus said count position.

8. The shifter unit according to claim 1, wherein when said requested instruction is a rotate through carry right instruction for a count position of an input data word,
said right input data word is said input data word,
said left input data word is a source data word,
said right shift amount is said count position,
said left shift amount equals a bit width of said input data word minus said count position plus one, and
a data bit of the output result indexed by said count position equals a carry bit of said input data word.

9. The shifter unit according to claim 1, wherein when said requested instruction is a rotate through carry left instruction for a count position of an input data word,
said left input data word is said input data word,
said right input data word is a source data word,
said left shift amount is said count position,
said right shift amount equals a bit width of said input data word minus said count position plus one, and
a data bit of the output result indexed by said count position equals a carry bit of said input data word.

10. The shifter unit according to claim 1, wherein when said requested instruction is a double precision shift left instruction,
said left shift input data word is said input data word,
said right shift input data word is an auxiliary data word,
a first number position is a count position, and
a second number position equals a fixed number minus said count position.

11. The shifter unit according to claim 1, wherein when said requested instruction is a double precision shift right instruction for a count position of an input data word,
said right shift input data word is said input data word,
said left shift input data word is an auxiliary data word,
said right shift amount is said count position, and
said left shift amount equals a bit width of said input data word minus said count position.

12. The shifter unit according to claim 1, wherein said requested instruction is at least one of a shift instruction, a shift arithmetic instruction, a rotate instruction, a rotate through carry instruction, and a double precision shift instruction.

13. A method of performing a requested instruction, comprising the steps of:
left shifting a left shift input data word for a left shift amount to form a left shifted data word;
right shifting a right shift input data word for a right shift amount to form a right shifted data word; and
performing an OR logic operation on said left shifted result and said right shifted result to form an output result.

14. The method according to claim 13, wherein said left shift input word is provided by a first multiplexer coupled to a register file, and said right shift input word is provided by a second multiplexer coupled to said register file, said register file comprising a plurality of operands.

15. The method according to claim 13, wherein when said requested instruction is a left shift instruction of an input data word, said left shift input data word is said input data word, and said output result is said left shifted data word.

16. The method according to claim 13, wherein when said requested instruction is a right shift instruction of an input data word, said right shift input data word is said input data word, and said output result is said right shifted data word.

17. The method according to claim 13, wherein when said requested instruction is a right shift instruction of an input data word, said right shift input data word is said input data word, and said output result is said right shifted data word.

18. The method according to claim 13, wherein when said requested instruction is a rotate instruction of an input data word, said left shift input data word and said right shift input data word are both set equal to said input data word.

19. The method according to claim 18, wherein when said rotate instruction is a rotate right instruction for a count position, said right shift amount is said count position and said left shift amount equals a bit width of said input data word minus said count position.

20. The method according to claim 18, wherein when said rotate instruction is a rotate left instruction for a count position, said left shift amount is said count position and said left shift amount equals a bit width of said input data word minus said count position.

21. The method according to claim 13, wherein when said requested instruction is a rotate through carry right instruction for a count position of an input data word,
said right input data word is said input data word,
said left input data word is a source data word,
said right shift amount is said count position,
said left shift amount equals a bit width of said input data word minus said count position plus one, and
a data bit of the output result indexed by said count position equals a carry bit of said input data word.

22. The method according to claim 13, wherein when said requested instruction is a rotate through carry left instruction for a count position of an input data word,
said left input data word is said input data word,
said right input data word is a source data word,
said left shift amount is said count position,
said right shift amount equals a bit width of said input data word minus said count position plus one, and
a data bit of the output result indexed by said count position equals a carry bit of said input data word.

23. The method according to claim 13, wherein when said requested instruction is a double precision shift left instruction, said left shift input data word is said input data word, said right shift input data word is an auxiliary data word, a first number position is a count position and a second number position equals a fixed number minus said count position.

24. The method according to claim 13, wherein when said requested instruction is a double precision shift right instruction for a count position of an input data word, said right shift input data word is said input data word, said left shift input data word is an auxiliary data word, said right shift amount is said count position and a left shift amount equals a bit width of said input data word minus said count position.

25. The method acceding to claim 13, wherein said requested instruction is at least one of a shift instruction, a shift arithmetic instruction, a rotate instruction, a rotate through carry instruction, and a double precision shift instruction.

26. The method to claim 13, wherein when said instruction is a bit test type instruction for an index position of an input data word with a carry bit, further comprising the steps of:

rotating said carry bit with said input data word to form an intermediate data word such that said carry bit contains a data bit of said index position of said input data word before the step of rotating;

outputting said carry bit;

performing a logic operation on said carry bit to form a new carry bit value; and rotating said carry bit with said intermediate data word to form a result data word such that the index position of said result data word contains said new carry bit value.

27. The method according to claim 26, wherein when said bit test type instruction is a bit test instruction, said logic operation does not change said carry bit.

28. The method according to claim 26, wherein when said bit test type instruction is a bit test and complement instruction, said logic operation complements said carry bit.

29. The method according to claim 26, wherein when said bit test type instruction is a bit test and set instruction, said logic operation sets said carry bit.

30. The method according to claim 26, wherein when said bit test type instruction is a bit test and reset instruction, said logic operation resets said carry bit.

31. A method of rotating a data word by a rotation number using a right shifter and a left shifter, said data word comprising a number of data bits, comprising the steps of:

shifting right of said data word by a right shift number to form a right shifted data word, wherein said right shift number depends on said rotation number;

shifting left of said data word by a left shift number to form a left shifted data word, wherein said left shift number depends on said rotation number; and performing an OR function using said right shifted data word and said left shifted data word.

* * * * *